US012122653B2

(12) United States Patent
Moon (10) Patent No.: US 12,122,653 B2
(45) Date of Patent: Oct. 22, 2024

(54) SINGLE DRIVE AXLE BRAKE OF ELECTRIC FORKLIFT

(71) Applicant: SEIL INDUSTRY CO., LTD., Jinju-si (KR)

(72) Inventor: Hyoung Woo Moon, Jinju-si (KR)

(73) Assignee: SEIL INDUSTRY CO., LTD., Jinju-si (KR)

( * ) Notice: Subject to any disclaimer, the term of this patent is extended or adjusted under 35 U.S.C. 154(b) by 225 days.

(21) Appl. No.: 17/781,045

(22) PCT Filed: Nov. 6, 2020

(86) PCT No.: PCT/KR2020/015498
§ 371 (c)(1),
(2) Date: May 31, 2022

(87) PCT Pub. No.: WO2021/132874
PCT Pub. Date: Jul. 1, 2021

(65) Prior Publication Data
US 2022/0411243 A1    Dec. 29, 2022

(30) Foreign Application Priority Data

Dec. 23, 2019 (KR) .......................... 10-2019-0173274

(51) Int. Cl.
*B66F 9/075* (2006.01)
(52) U.S. Cl.
CPC ...... *B66F 9/07509* (2013.01); *B66F 9/07572* (2013.01)
(58) Field of Classification Search
CPC .................. B66F 9/07509; B66F 9/07572
See application file for complete search history.

(56) References Cited

U.S. PATENT DOCUMENTS

| 3,659,480 A | * | 5/1972 | Koivunen | ............... F16H 47/08 475/71 |
| 4,644,823 A | * | 2/1987 | Mueller | ............... F16H 48/30 475/86 |

(Continued)

FOREIGN PATENT DOCUMENTS

| CN | 204415044 U | * | 6/2015 |
| CN | 204623148 U | * | 9/2015 |

(Continued)

OTHER PUBLICATIONS

International Search Report for PCT/KR2020/015498 mailed Jan. 5, 2021 from Korean Intellectual Property Office.

(Continued)

*Primary Examiner* — Jacob B Meyer
(74) *Attorney, Agent, or Firm* — Revolution IP, PLLC (57) ABSTRACT

A single drive axle brake includes: a differential unit (300) for separating and transferring the driving power received from the motor (100) to both sides; a differential gear unit (340) for distributing and transferring the driving power transferred from the motor to the wheels disposed on both sides; and a brake unit (360) for restricting the differential gear unit (340). Differential side gears (344, 345) geared with a differential pinion gear are disposed inside a differential gear case (347) coupled with a crown wheel (341) of the differential unit, and the brake unit (360) includes a main brake (380) for restricting and stopping the differential gear case (347), and a subsidiary brake (390) for stopping the rotation of the power shaft (349).

4 Claims, 6 Drawing Sheets

(56) References Cited

U.S. PATENT DOCUMENTS

| | | | | |
|---|---|---|---|---|
| 4,667,784 | A * | 5/1987 | Cronin | B60T 1/065 |
| | | | | 475/221 |
| 4,893,525 | A * | 1/1990 | Gabor | F16H 48/08 |
| | | | | 475/225 |
| 4,895,217 | A * | 1/1990 | Hueckler | B60K 17/3462 |
| | | | | 180/247 |
| 5,041,069 | A * | 8/1991 | Horst | F16H 48/24 |
| | | | | 475/86 |
| 6,616,563 | B2 * | 9/2003 | Inoue | F16H 57/0423 |
| | | | | 475/198 |
| 6,907,946 | B1 * | 6/2005 | Buckley | B62D 55/125 |
| | | | | 188/38 |
| 7,585,246 | B2 * | 9/2009 | Chludek | F16H 48/27 |
| | | | | 475/233 |
| 9,238,406 | B2 * | 1/2016 | Stares | B60K 23/0808 |
| 9,751,403 | B2 * | 9/2017 | Steidl | F16H 48/08 |
| 2006/0240931 | A1 * | 10/2006 | Habel | B60K 17/16 |
| | | | | 475/150 |
| 2022/0411243 | A1 * | 12/2022 | Moon | B60K 17/16 |

FOREIGN PATENT DOCUMENTS

| | | | |
|---|---|---|---|
| CN | 209351250 U | 9/2019 | |
| DE | 3617074 C2 | 3/1989 | |
| DE | 10327458 A1 | 1/2005 | |
| DE | 102005018907 A1 | 11/2006 | |
| DE | 102008061451 A1 * | 6/2010 | B66F 9/07572 |
| KR | 10-1991375 B1 | 6/2019 | |

OTHER PUBLICATIONS

The extended European search report of European Patent Application No. 20908051.4 mailed May 8, 2023.
First Office Action of Chinese Patent Application No. 202080083298.0 mailed Aug. 31, 2023.
Second Office Action of Chinese Patent Application No. 202080083298.0 mailed Dec. 6, 2023.
Third Office Action of Chinese Patent Application No. 202080083298.0 mailed Mar. 7, 2024.

* cited by examiner

FIG. 1

Prior Art

FIG. 2

Prior Art

Detail view of Part "B"

SINGLE DRIVE AXLE BRAKE OF ELECTRIC FORKLIFT

CROSS REFERENCE TO PRIOR APPLICATIONS

This application is the 35 U.S.C. 371 national stage of international application PCT/KR2020/015498 filed on Nov. 6, 2020, which claims priority to Korean application 10-2019-0173274 filed on Dec. 23, 2019. The entire contents of each of the above-identified applications are hereby incorporated by reference.

TECHNICAL FIELD

The present invention relates to a brake system installed in a differential unit of a single drive axle of an electric forklift using an electric motor.

BACKGROUND ART

In general, a forklift is a kind of special vehicles used to lift or transport cargo in various industrial sites. Such a forklift basically includes a fork or a carriage for lifting or unloading cargo outside the vehicle, and an engine or a motor mounted inside a forklift body to drive the forklift.

Moreover, an industrial vehicle such as a forklift includes a power transmission system that motors using electricity or hydraulic pressure and respectively mounted on driving wheels are merged with brake units and planetary gear assemblies so as to simplify driving and control systems. However, since the motors, the driving means and the braking means are directly connected to each other, the industrial vehicle has a disadvantage in that the vehicle shakes or a driving direction is changed due to an operation time difference and an operation pressure difference of the brake units respectively mounted on the driving wheels.

Furthermore, since a motor driving gear directly connected to the rotary shaft of the driving motor is arranged to be biased toward one side of the vehicle and a differential unit geared with the motor driving gear is also arranged at the same position, a distance between right and left wheel adapters which transfer driving power from the differential unit to wheels mounted outside is varied, and lengths of driving shafts which transfer driving power distributed from the differential unit to the wheel adapters are different from each other. So, there is a problem in that the driving shafts and the wheel adapters must be manufactured differently.

DISCLOSURE

Technical Problem

Accordingly, the present invention has been made in view of the above-mentioned problems occurring in the related art, and it is an object of the present invention to provide a single drive axle brake for an electric forklift, which includes: a differential unit for separating and transferring driving power transmitted from a motor to both sides by driving power of one motor; a differential gear unit formed in the differential unit for distributing and transferring the driving power transmitted from the motor to wheels disposed at both sides; and a brake unit for restricting the differential gear unit so that just one brake unit can restrict a power transmission unit for transferring the driving power generated from the motor to the differential gear unit and a power shaft for transferring driving power provided from the differential gear unit to the wheels, thereby narrowing an interval between the wheels disposed at both sides of the differential unit, and enhancing safety of the forklift by providing the center of the drive axle lower than that of the conventional art.

It is another object of the present invention to provide a single drive axle brake for an electric forklift in which the brake unit is mounted on the opposite side of a motor gear since the differential unit geared with a motor driving gear is biased to one side and the center of gravity of the forklift is changed, thereby reducing a deviation in the center of gravity of a power unit.

It is a further object of the present invention to provide a single drive axle brake for an electric forklift in which a power transmission module is mounted to be biased to any one among both side wheel adapters, the brake unit is attached to the side of the differential unit which is longer so as to separate power shafts since driving shafts for transferring the driving power to the wheel adapters are different in length, and the power shaft and the driving shaft are connected by a spline collar supported by a bearing, thereby making lengths and sizes of the driving shafts equal so as to be used in common.

The technical problems to be achieved through the present invention are not limited as mentioned above, and other technical problems not mentioned herein will be obviously understood by one of ordinary skill in the art through the following description.

Technical Solution

To accomplish the above-mentioned objects, according to the present invention, there is provided a single drive axle brake for an electric forklift to transfer driving power of a motor to wheels disposed on right and left sides of driving shafts, the single drive axle brake including: a differential unit for separating and transferring the driving power received from the motor to both sides; a differential gear unit for distributing and transferring the driving power transferred from the motor to the wheels disposed on both sides; and a brake unit for restricting the differential gear unit.

Preferably, the differential gear unit includes: a crown wheel of the differential unit receiving the driving power from the motor; a differential gear case coupled with the crown wheel; a differential pinion gear mounted to be able to rotate and revolve with the differential gear case; and differential side gears geared with the differential pinion gear inside the differential gear case coupled with the crown wheel of the differential unit, wherein the brake unit is formed to restrict the differential gear case.

Moreover, a power shaft for transferring the driving power provided from the differential gear unit is connected to the differential side gears of the differential gear, and the brake unit includes a main brake for stopping the rotation of the differential gear case.

Furthermore, the brake unit further includes a subsidiary brake for stopping the rotation of the power shaft.

Additionally, the main brake includes a main brake hub and main discs combined with the main brake hub. A portion of the inner circumferential surface of the main brake hub is joined to the outer circumferential surface of the differential gear case, and the main discs are combined on the outer circumferential surface of the main brake hub at regular intervals.

In addition, the main brake hub has a cylindrical shape that cylinders having different diameters are joined to each other to form a stepped portion, wherein the inner circumferential surface of a cylindrical part having a relatively smaller diameter is joined to the outer circumferential surface of the differential gear case and the outer circumferential surface of the cylindrical part having a relatively larger diameter is joined to the main disc.

Moreover, the subsidiary brake includes a subsidiary brake hub and a subsidiary disc coupled to the subsidiary brake hub. The inner circumferential surface of the subsidiary brake hub is coupled to the outer circumferential surface of the power shaft, and the subsidiary disc is coupled to the outer circumferential surface of the subsidiary brake hub at regular intervals.

Furthermore, the subsidiary brake hub has a first cylinder having a smaller diameter and a second cylinder having a larger diameter which are connected with each other by a connection member, the inner circumferential surface of the first cylinder is joined to the outer circumferential surface of the power shaft, and the subsidiary disc is joined to the outer circumferential surface of the second cylinder. Plates have a doughnut-shape of which the center is perforated, two or more assembly holes into which support rods coupled to the outer case are inserted are formed at a predetermined position of the doughnut-shaped disc plate. The inner diameter of the assembly hole is formed to be larger than the outer diameter of the support rod.

Additionally, the main disc and the subsidiary disc face each other and are arranged adjacent to each other. The fixed plates are inserted between the main discs and between the subsidiary discs, and the fixed plate is also inserted between the main disc and the subsidiary disc facing each other.

In addition, the main disc and the subsidiary disc have a doughnut shape of which the center is perforated. The inner diameter of the center of the main disc and the inner diameter of the center of the subsidiary disc are equal, and the outer diameter of the main disc and the outer diameter of the subsidiary disc are also equal. Since each plate is disposed between the main disc and the subsidiary disc, the discs and the plates are sequentially arranged, and the plates are arranged at both ends, the plates, the main discs, and the subsidiary discs are compressed and stopped by a hydraulic cylinder which presses the plates, and the main brake hub and the subsidiary brake hub are stopped when the main disc and the subsidiary disc are stopped.

The disc of one among the plates of both ends is pressed by the hydraulic cylinder, and a plate supporter for supporting the other plate approaches the other plate to compress the plate, the main disc and the subsidiary disc by compression of the hydraulic cylinder. Therefore, the plates, the main discs and the subsidiary discs can be supported and compressed by the plate supporter.

Furthermore, the hydraulic cylinder is arranged on the opposite side of the differential unit to operate only one cylinder so that the main disc and the subsidiary disc are stopped simultaneously.

The inside of the outer case is machined into a multi-stage cylinder. A piston mounting portion on which a piston of the hydraulic cylinder is mounted to move, a plate mounting portion on which the plates, the main discs and the subsidiary disc are mounted, and a plate support mounting portion to which a plate supporter is coupled and fixed are formed on the outer case in consecutive order.

The piston is mounted on the piston mounting portion. The piston advances toward the plate mounting portion by a fluid supplied from the outside, and a piston return unit for moving the advanced piston to an initial position is provided.

In addition, the central line of the driving shaft of the differential unit is referred to as a first center line, and a line crossing the first center line at the center of the differential unit is referred to as a second center line. The left side from the second center line is called one side and the right side from the second center line is called the other side. A reduction means for reducing driving power of the motor and transferring the driving power to the differential unit, and a power transmission housing formed to surround the reduction means and a differential gear unit are provided, and the brake unit is coupled to the other side of the power transmission housing.

The above and other objects, features and advantages of the present invention will be more clearly understood from the following detailed description taken in conjunction with the accompanying drawings.

The terms and words used in the specification and claims must not be limited to typical or dictionary meanings, but must be regarded as concepts selected by the inventor as concepts which best illustrate the present invention, and must be interpreted as having meanings and concepts adapted to the scope and spirit of the present invention to aid in understanding the technology of the present invention.

Advantageous Effects

According to the present invention, the single drive axle brake for an electric forklift includes: a differential unit for separating and transferring driving power transmitted from a motor to both sides by driving power of one motor; a differential gear unit formed in the differential unit for distributing and transferring the driving power transmitted from the motor to wheels disposed at both sides; and a brake unit for restricting the differential gear unit so that just one brake unit can restrict a power transmission unit for transferring the driving power generated from the motor to the differential gear unit and a power shaft for transferring driving power provided from the differential gear unit to the wheels, thereby narrowing an interval between the wheels disposed at both sides of the differential unit, and enhancing safety of the forklift by providing the center of the drive axle lower than that of the conventional art.

Furthermore, the single drive axle brake for an electric forklift according to the present invention can reduce a deviation in the center of gravity of a power unit since the brake unit is mounted on the opposite side of a motor gear since the differential unit geared with a motor driving gear is biased to one side and the center of gravity of the forklift is changed.

In addition, the single drive axle brake for an electric forklift according to the present invention has a structure that a power transmission module is mounted to be biased to any one among both side wheel adapters, the brake unit is attached to the side of the differential unit which is longer so as to separate power shafts since driving shafts for transferring the driving power to the wheel adapters are different in length, and the power shaft and the driving shaft are connected by a spline collar supported by a bearing, thereby making lengths and sizes of the driving shafts equal so as to be used in common.

MODE FOR INVENTION

Hereinafter, preferred embodiments will be described with reference to the accompanying drawings. In the drawings, thicknesses of lines and sizes of constituent elements may be exaggerated for clarity and convenience in explanation.

Furthermore, terms to be described later are defined in consideration of the functions of the present invention, and may differ depending on the intentions of a user or an operator or custom. Accordingly, such wordings should be defined on the basis of the contents of the overall specification.

In addition, the embodiment disclosed hereinafter does not limit the scope of the present invention, but corresponds to merely exemplary terms of constituent elements presented in claims of the present invention, and the embodiments that include replaceable constituent elements as equivalents of the constituent elements defined in the overall specification and claims may be included in the scope of the present invention.

Figure 1:
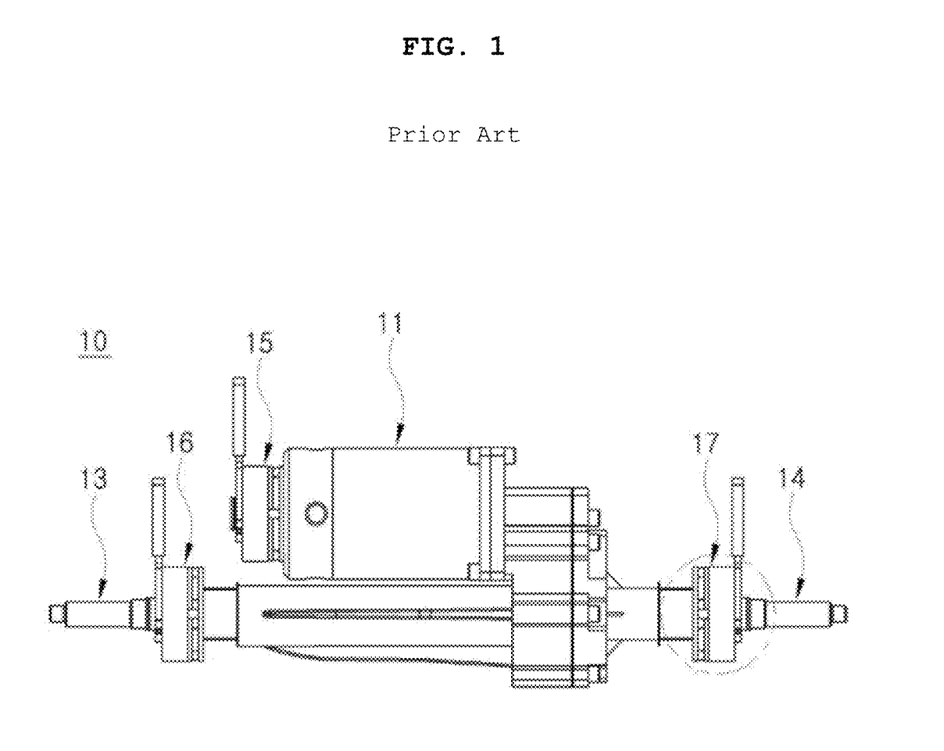
FIG. 1 is a schematic diagram of a single drive axle according to a conventional art.
Figure 2:
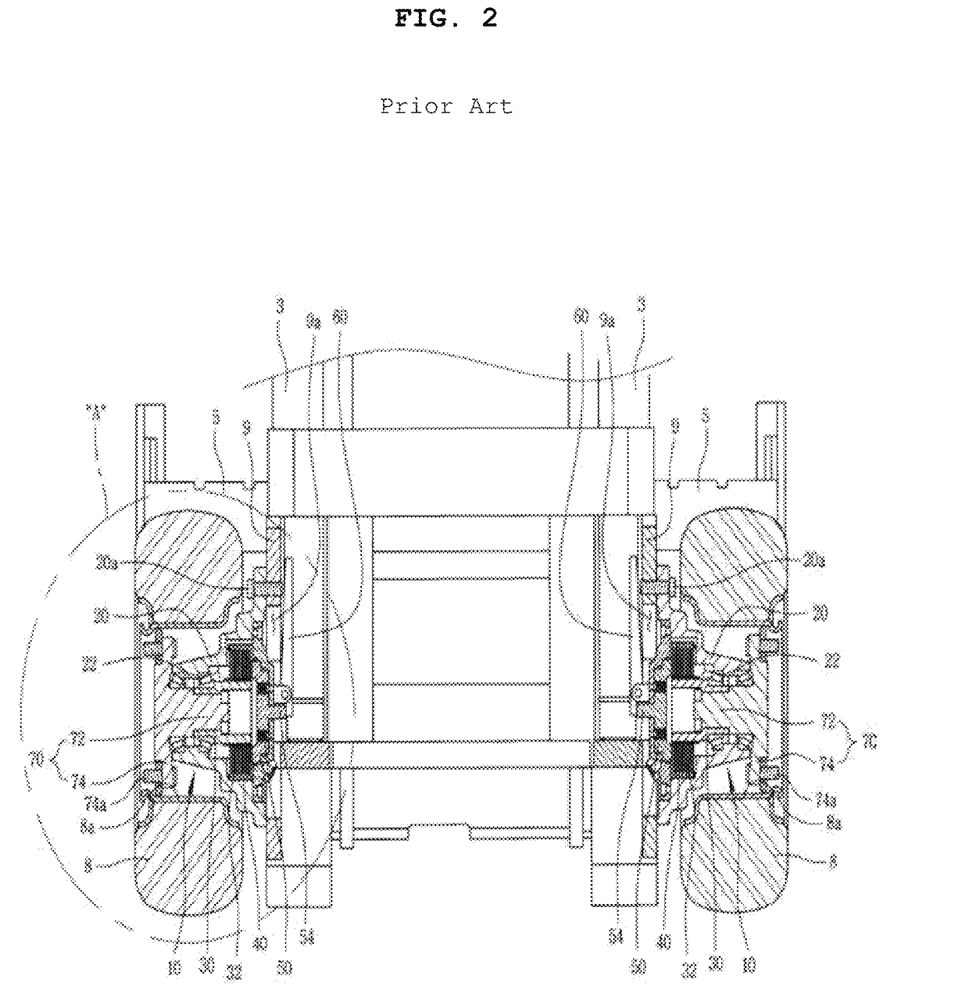
FIG. 2 is a cross-sectional view illustrating a brake structure of an electric forklift according to a conventional art.
Figure 3:
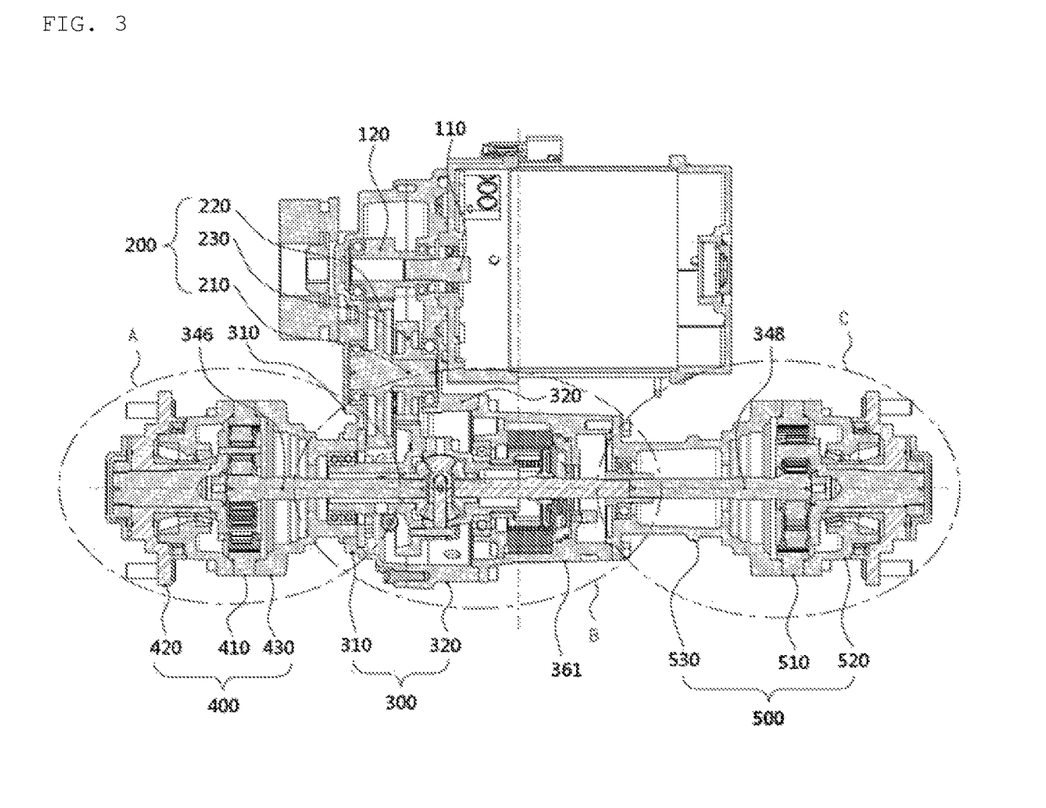
FIG. 3 is a cross-sectional view illustrating a single drive axle according to a preferred embodiment of the present invention.
Figure 4:
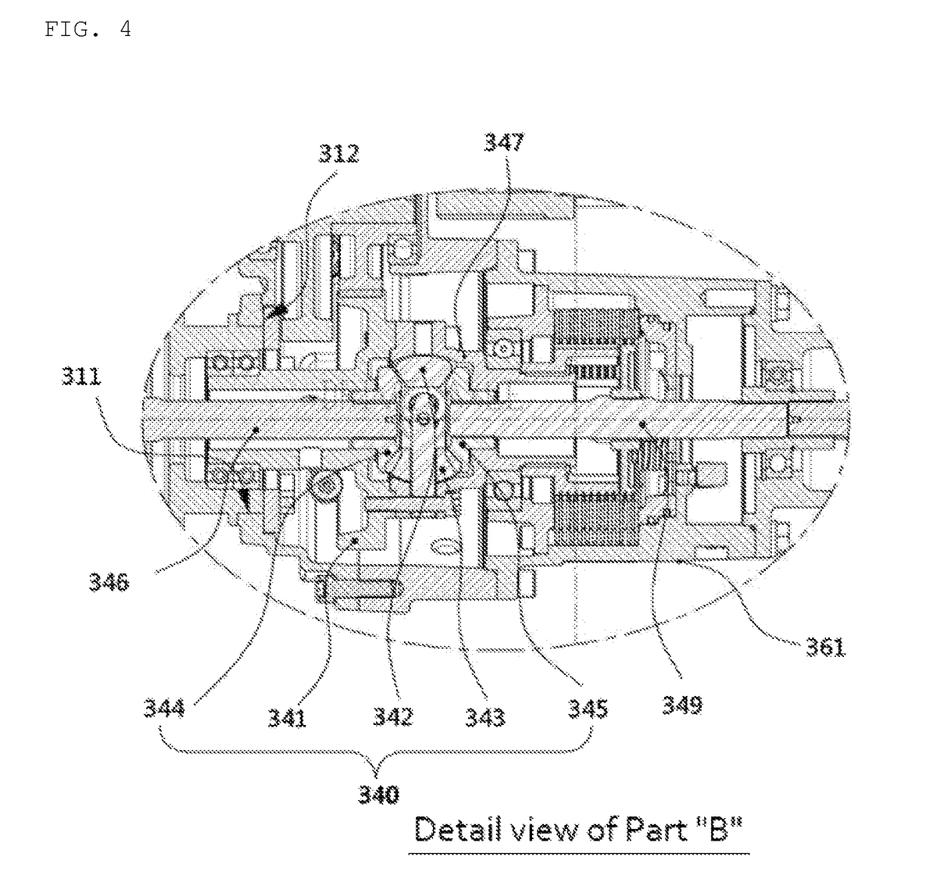
FIG. 4 is an enlarged view of a part "B" of FIG. 3.
Figure 5:
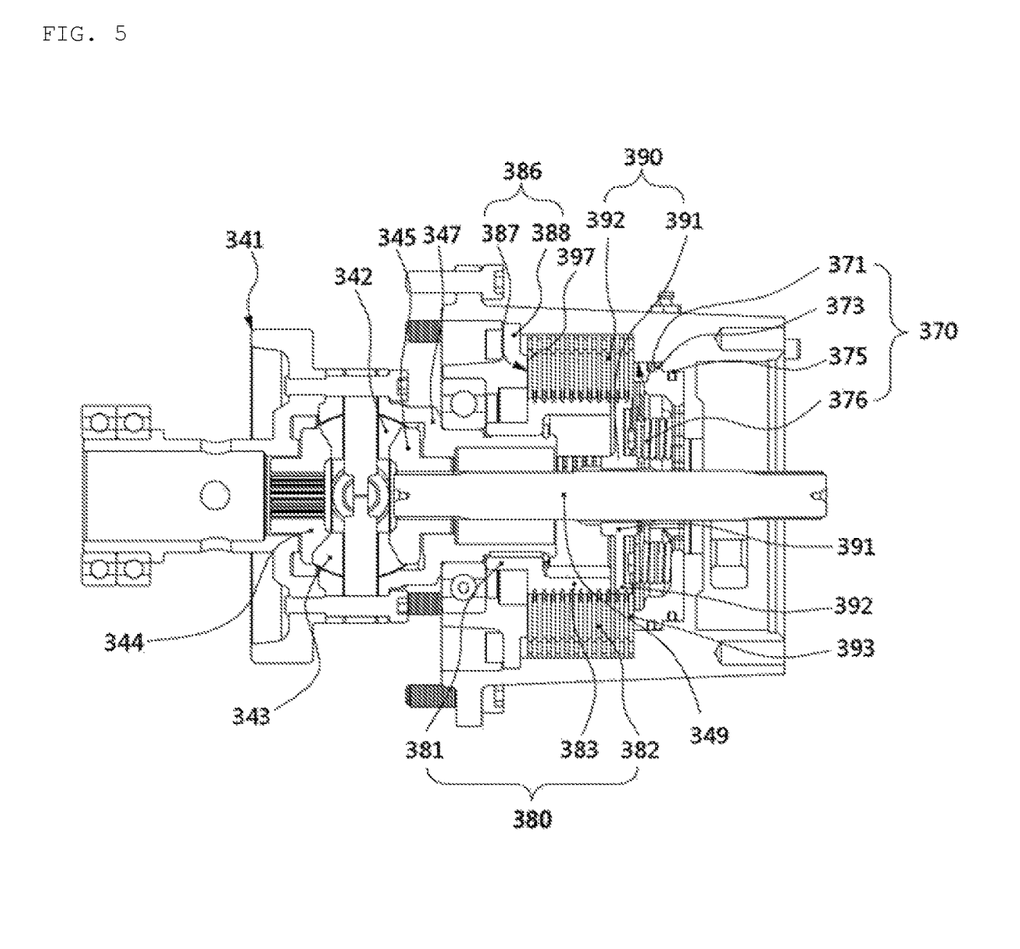
FIG. 5 is a cross-sectional view illustrating a brake structure according to the present invention.
Figure 6:
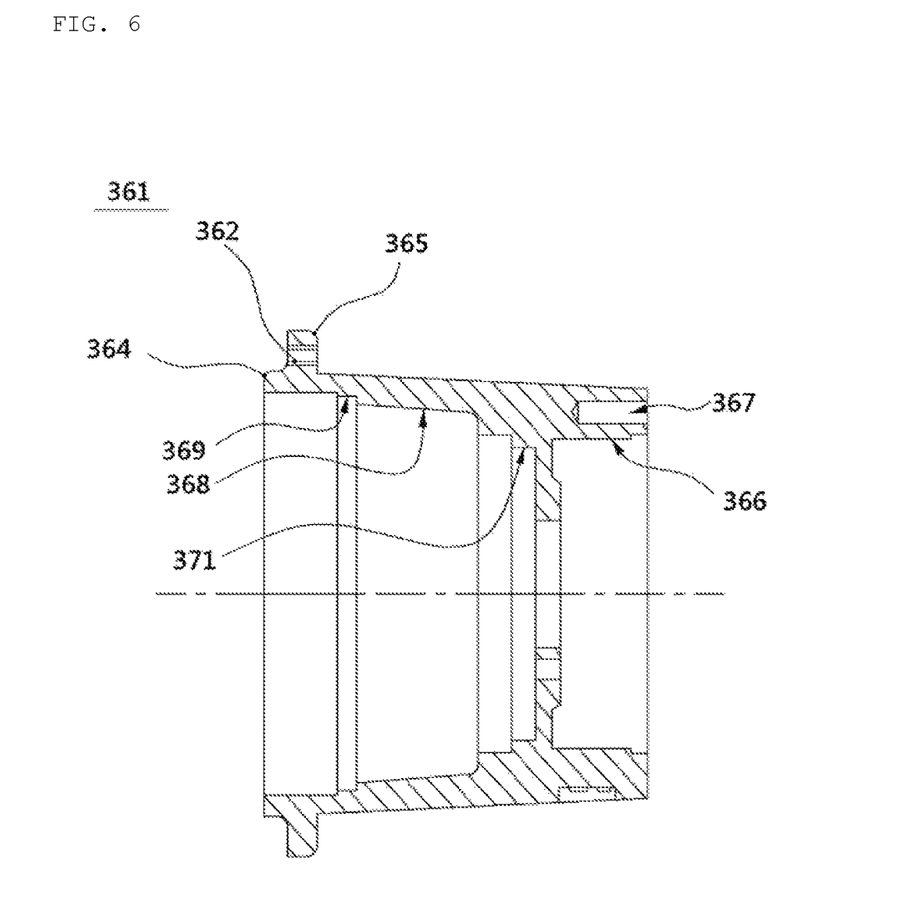
FIG. 6 is a cross-sectional view illustrating an outer case of a brake unit according to the present invention.

FIG. 1 is a schematic diagram of a single drive axle according to a conventional art, FIG. 2 is a cross-sectional view illustrating a brake structure of an electric forklift according to a conventional art, FIG. 3 is a cross-sectional view illustrating a single drive axle according to a preferred embodiment of the present invention, FIG. 4 is an enlarged view of a part "B" of FIG. 3, FIG. 5 is a cross-sectional view illustrating a brake structure according to the present invention, and FIG. 6 is a cross-sectional view illustrating an outer case of a brake unit according to the present invention.

In order to better understand the development environment of a single drive axle of an electric forklift using an electric motor according to an embodiment of the present invention, FIG. 1 illustrates a single drive axle according to a conventional art.

Referring to FIG. 1, The single drive axle according to the conventional art includes: a motor brake 15 mounted to brake a motor shaft connected to a motor; a differential unit 12 connected to the motor shaft via gears to receive driving power of the motor to transfer the driving power to wheels and divided into right and left driving shafts; right and left driving units into which driving shafts for transferring the driving power from the differential unit to the wheels are inserted; and driving shaft brakes 16 and 17 to apply braking power of the driving shafts.

In addition, FIG. 2 is a cross-sectional view illustrating a brake structure attached to a front wheel of the electric forklift according to the conventional art.

As illustrated in FIG. 1, components for transferring a rotational force of the motor to the wheels mounted outside are included inside two housings.

As described above, since the differential unit and the driving system for transferring the driving force to the wheels are all disposed inside the two housing, there is difficulty in machining and handling the housings.

Moreover, since brake systems are respectively attached to the right and left driving shafts on which the wheels are mounted, the forklift vehicle shakes or a driving direction is changed due to an operation time difference and an operation binding force of the brake units respectively mounted on the driving wheels.

Furthermore, as illustrated in FIG. 1, the motor driving gear directly connected to the rotary shaft of the driving motor is arranged to be biased to one side of the forklift vehicle. Accordingly, since a distance between the right and left wheel adapters transferring the driving force from the differential unit to the wheels mounted outside is varied and lengths of the driving shafts transferring the driving force from the differential unit to the wheel adapters are different, they must be manufactured individually.

Additionally, since the differential unit geared with the motor driving gear is biased to one side, the center of gravity of the forklift vehicle is also biased to one side.

In the single drive axle according to the conventional art, the brake unit is mounted on both side wheel adapters. However, in order to solve the problem of the conventional art and solve the technical problem mentioned above, in a single drive axle of an electric forklift using an electric motor according to the present invention, a brake unit for restricting a differential gear of a differential unit geared with a motor driving gear is located to be opposed to a motor driving gear so as to reduce a deviation in the center of gravity of a forklift vehicle.

In addition, the brake unit for restricting the differential gear is formed to restrict a differential gear case which is combined with a crown gear of the differential gear.

Moreover, when the brake unit restricts the differential gear case, all of power transmission units transferring driving power of a motor to the differential unit are restricted and stopped.

Moreover, the wheels are stopped generally, but if any one of the wheels slips, there is a difference in friction force between the wheels due to the slip. Accordingly, there is a difference also in rotational force applied to differential side gears respectively connected to the driving shafts transferring the driving power from the differential gear to the wheels mounted outside. Due to the difference in rotational force applied to the two differential side gears, differential pinion gears respectively geared with the differential side gears run idle. So, there is a difference in rotational angle of the two wheels due to idling of the differential pinion gears, and it may cause a vibration of the forklift vehicle or a change in driving direction. The single drive axle of the electric forklift using the electric motor according to the present invention further includes a subsidiary brake for restricting and stopping rotation of the driving shaft transferring the driving power from the differential gear. Therefore, a main brake, which stops the rotation of the differential gear case, and the subsidiary brake are restricted simultaneously so as to stop the rotation.

As described above, the single drive axle according to the conventional art has the brake units disposed inside the right and left wheel adapter modules, but the single drive axle according to the present invention has the brake unit disposed on the differential gear. Therefore, the single drive axle according to the present invention can narrow the distance between the wheels disposed at the right and left sides of the driving shafts, make the center of the drive axle lower than the conventional art, and reduce the deviation of the center of gravity so as to reduce noise of the forklift and improve safety.

Furthermore, the motor driving gear, a reduction means, and the differential unit which separates and transfers driving power transferred from the reduction means are manufactured into one module, namely, a power transmission module. The components transferring the driving power transferred from the power transmission module to the wheels mounted outside are modularized to be detachable, thereby providing convenience in maintenance and manufacturing.

Especially, since the power transmission module is mounted to be biased to one wheel adapter among both wheel adapters and the driving shafts transferring driving power to the wheel adapters are different in length, the brake unit is attached to the side of the differential unit which is longer so as to separate the driving shafts, and a power shaft and the driving shaft are connected by a spline collar supported by a bearing, thereby making the length and size of both driving shafts equal.

Gear cutting is applied to the inside of a reduction unit housings of the both wheel adapters so that the reduction unit serves as a ring gear, thereby integrating the reduction unit housing and the ring gear into a single module. Therefore, the single drive axle for the electric forklift according to the present invention can improve convenience in repairing and manufacturing.

Hereinafter, referring to the drawings, a preferred embodiment of the present invention will be described in detail.

As illustrated in FIG. 3, in order to transfer driving power of the motor to the wheels disposed at the right and left sides of the driving shaft, the single drive axle for the electric forklift according to the present invention includes: a reduction means 200 decelerating driving power of a motor 100 to transfer the driving power to a differential unit 300; the differential unit 300 disposed in parallel with the shaft of the motor 100 to separate and transfer the driving power transferred from the reduction means 200 to both sides; and right and left wheel adapter modules 400 and 500 respectively combined with both sides of the differential unit 300 to transfer the driving power from the differential unit 300 to the wheels mounted outside.

Now, a brake unit 360 for restricting a differential gear unit 340 will be described. The differential gear unit 340 includes: a crown wheel 341 of the differential unit receiving the driving power from the motor; a differential gear case 347 coupled with the crown wheel 341; a differential pinion gear mounted to be able to rotate and revolve with the differential gear case 347; and differential side gears 344 and 345 geared with the differential pinion gear inside the differential gear case 347 coupled with the crown wheel 341 of the differential unit. The brake unit 360 is formed to restrict the differential gear case 347.

Additionally, a power shaft 349 for transferring the driving power provided from the differential gear unit 340 is connected to the differential side gears 344 and 345 of the differential gear. The brake unit 360 further includes: a main brake 380 for stopping the rotation of the differential gear case 347; and a subsidiary brake 390 for stopping the rotation of the power shaft 349.

The main brake 380 includes a main brake hub 381 and main discs 382 combined with the main brake hub. A portion of the inner circumferential surface of the main brake hub is joined to the outer circumferential surface 383 of the differential gear case, and the main discs 382 are combined on the outer circumferential surface 383 of the main brake hub at regular intervals.

In addition, the main brake hub 381 has a cylindrical shape that cylinders having different diameters are joined to each other to form a stepped portion, wherein the inner circumferential surface of a cylindrical part having a relatively smaller diameter is joined to the outer circumferential surface 383 of the differential gear case and the outer circumferential surface of the cylindrical part having a relatively larger diameter is joined to the main disc 382.

The subsidiary brake 390 includes a subsidiary brake hub 391 and a subsidiary disc 392 coupled to the subsidiary brake hub, wherein the inner circumferential surface of the subsidiary brake hub is coupled to the outer circumferential surface of the power shaft, and the subsidiary disc 392 is coupled to the outer circumferential surface 393 of the subsidiary brake hub at regular intervals.

In addition, the subsidiary brake hub 391 has a first cylinder having a smaller diameter and a second cylinder having a larger diameter which are connected with each other by a connection member, the inner circumferential surface of the first cylinder is joined to the outer circumferential surface of the power shaft, and the subsidiary disc 392 is joined to the outer circumferential surface of the second cylinder.

Additionally, fixed plates 397 are inserted between the joined main discs 382 and between the subsidiary discs 392 at regular intervals. Each of the plates 397 is a doughnut-shaped disc plate of which the center is perforated. Two or more assembly holes 398 into which support rods coupled to the outer case 361 are inserted are formed toward an outer diameter portion of the doughnut-shaped disc plate. The inner diameter of the assembly hole 398 is formed to be larger than the outer diameter of the support rod. Therefore, the plate 397 is movable according to a guide of the support rod when being fixed.

Furthermore, the main disc 382 and the subsidiary disc 392 face each other and are arranged adjacent to each other. The fixed plates 397 are inserted between the main discs 382 and between the subsidiary discs 392. The fixed plate 397 is also inserted between the main disc 382 and the subsidiary disc 392 facing each other. The main disc 382 and the subsidiary disc 392 have a doughnut shape of which the center is perforated. The inner diameter of the center of the main disc and the inner diameter of the center of the subsidiary disc are equal, and the outer diameter of the main disc and the outer diameter of the subsidiary disc are also equal.

Additionally, as each plate 397 is disposed between the main disc 382 and the subsidiary disc 392, the discs and the plates are sequentially arranged. The plates 397 are disposed at both ends thereof, and the plates and the discs are compressed by a hydraulic cylinder 370 pressing the plates 397 so that the main disc 382 and the subsidiary disc 392 are stopped. When the main disc 382 and the subsidiary disc 392 are stopped, the main brake hub 381 and the subsidiary brake hub 391 are stopped.

In addition, the hydraulic cylinder 370 is arranged on the opposite side of the differential unit so that the main disc 382 and the subsidiary disc 392 are stopped simultaneously by one cylinder.

In the single drive axle of the electric forklift, the central line of the driving shaft of the differential unit 300 is referred to as a first center line, and a line crossing the first center line at the center of the differential unit is referred to as a second center line. The left side from the second center line is called one side and the right side from the second center line is called the other side.

The single drive axle of the electric forklift includes: a motor driving gear 120 directly connected to the rotary shaft 110 of the motor; a reduction gear rotary shaft 210 which is parallel with the rotary shaft 110 of the motor; a first reduction gear 220 of the reduction means 200 gearing with the motor driving gear 120; and a second reduction gear 230 coupled to the same shaft as the first reduction gear.

The single drive axle further includes a differential gear 350 formed to be geared with the second reduction gear 230.

Moreover, the single drive axle further includes a power transmission housing 330 formed to surround the motor driving gear 120, the reduction means 200 and the differential gear 350, and the power transmission housing 330 is formed to be divided into one side power transmission housing 310 and the other side power transmission housing 320.

Furthermore, the differential gear unit 340 includes: a crown wheel 341 of the differential unit geared with the second reduction gear 230 of the reduction means 200; and small differential gears 342 and 343 and one side and the other side large differential gears 344 and 345 which separate and transfer the driving power of the crown wheel 341 to both sides. Therefore, the rotational force of the motor is separated and transferred to the both driving shafts through the one side and the other side large differential gears 344 and 345 of the differential gear unit 340 after passing through the reduction means 200.

Additionally, the one side driving shaft 346 coupled to the one side large differential gear 344 is connected to one side wheel adapter module 400, and the other side driving shaft 348 is connected to the other side large differential gear driving shaft and the other side large differential gear power shaft 349 connected to the brake unit 360. The other side driving shaft 348 is formed to be connected to the other side wheel adapter module 500.

Now, the configuration that the driving power from the power transmission housing 330 is transferred to one side wheel adapter 420 mounted outside will be described.

The left wheel adapter module 400 includes: one side wheel adapter 420 that the wheel is mounted outside; and one side reduction unit 410 which reduces the driving power transferred from the one side driving shaft 347 and transfers the driving power to the one side wheel adapter 420.

The one side reduction unit 410 is a planet gear reduction unit including: a sun gear coupled to the driving shaft; a plurality of planet gears mounted to engage with the sun gear to rotate; and a ring gear surrounding the planet gear. Gear cutting is applied to the inside of the one side reduction unit housing 411 so that the reduction unit serves as a ring gear, thereby integrating the housing and the ring gear into a single module.

In addition, one side wheel adapter connection bridge 430 is disposed between the one side reduction unit housing 411 and the one side power transmission housing 310. On one side 431 of the one side wheel adapter connection bridge 430, formed are a first coupling part 432 coupled with the other side of the one side reduction unit housing 411, and a second coupling part 434 formed on the outer diameter portion adjacent to the other side 433 of the one side wheel adapter connection bridge 430 and coupled with the one side power transmission housing 310 in which the reduction means 200 and the differential gear unit 340 are embedded.

Moreover, the one side wheel adapter 420 includes an adapter housing 421 surrounding the one side wheel adapter 420, and one side of the one side reduction unit housing 411 is coupled to the other side of the adapter housing 421. An edge portion of a predetermined width is disposed on the coupled portion between the adapter housing 421 and the one side wheel adapter connection bridge 430.

Furthermore, the edge portion of the one side reduction unit housing 411 has a through hole formed at a predetermined portion, and a bolt is inserted into the through hole of the one side wheel adapter 420 so that the one side wheel adapter and the one side wheel adapter connection bridge are coupled by bolt fastening at the edge portion of the one side wheel adapter connection bridge 430.

Additionally, the outer diameter of the edge portion having a predetermined width and the outer diameter of the reduction unit housing 411 are equal at the coupled portion between the adapter housing 421 and the one side wheel adapter connection bridge 430.

Through the above configuration, the left wheel adapter module 400 has the wheel adapter 420 and the reduction unit 410 which can be assembled and disassembled on the wheel adapter connection bridge 430 using a plurality of fastening bolts. The reduction unit 410 has a plurality of planet gears embedded therein, and the ring gears surrounding the planet gears is integrated with the housing 411 to be modularized. Therefore, a process of machining a ring gear assembly unit for accommodating the ring gear inside the housing and a process of accommodating and fixing the ring gear inside the ring gear assembly unit may be omitted.

In addition, the left wheel adapter module 400 has high reduction ratio since the reduction unit 410 having the planet gears is mounted on the left wheel adapter module 400.

Moreover, when the planet gear gets damaged, the integrated reduction unit module can be replaced to be repaired conveniently and rapidly.

Furthermore, an outer diameter portion 436 formed near the other side surface 433 of the one side wheel adapter connection bridge 430 has a stepped portion 435 formed at a position spaced apart from the other side surface 433 at a predetermined distance. An assembly hole 311 into which the outer diameter portion is inserted is formed in the one side power transmission housing 310, and the outer diameter portion 436 having the stepped portion 435 of the one side wheel adapter connection bridge 430 is forcedly fitted and coupled into the assembly hole 311.

In addition, a bearing insertion inner diameter portion 437 into which a bearing 450 supporting the rotary shaft of the crown wheel 341 of the differential unit is inserted is disposed inside the outer diameter portion 436 of the one side wheel adapter connection bridge 430. The assembly hole 311 has a predetermined width in the direction of the first center line, and has a mounting portion 312 formed therein to be at right angles to the assembly hole 311.

Additionally, the mounting portion 312 includes a coupling ring 350 for coupling the one side wheel adapter connection bridge 430 and the one side power transmission housing 310, and a portion of the coupling ring 350 is provided with an overlapping portion formed to overlap the other side surface 433 of the one side wheel adapter connection bridge. A screw hole is formed in the other side 433 of the connection bridge, and a through-hole is formed in the overlapping portion of the coupling ring 350 so that the connection bridge and the coupling ring are screw-coupled through the through-hole.

In other words, the bearing insertion inner diameter portion 437 is provided inside the outer diameter portion 436 in which the stepped portion 435 of the one side wheel adapter connection bridge 430 is formed.

The one side power transmission housing 310 has the assembly hole 311, and the assembly hole 311 has a predetermined width in the direction of the first center line and the mounting portion 312 which is at right angles to the assembly hole 311 is disposed inside the assembly hole.

After the outer diameter portion 436 having the stepped portion 435 of the one side wheel adapter connection bridge 430 is forcedly fit into the assembly hole 311 formed in the one side power transmission housing 310, the bearing 450 which supports the rotary shaft of the crown wheel 341 of the differential unit is inserted into the bearing insertion inner diameter portion 437 formed in the outer diameter portion 436.

The coupling ring 350 is provided at the mounting portion 312 of the one side power transmission housing 310 on which the outer diameter portion 436 having the stepped portion 435 is fitted, and is coupled to the one wheel adapter connection bridge 430 by means of a fastening bolt through the through-hole formed in the coupling ring 350.

The assembly hole 311 formed in the one side power transmission housing 310 is forcedly fitted and coupled with the outer diameter portion 436 having the stepped portion 435, and the coupling ring 350 is fastened to the one side wheel adapter connection bridge 430 by means of a fastening bolt, thereby pressurizing and fixing the mounting portion 312 of the one side power transmission housing 310.

In addition, in order to set an assembly position of the forcedly fit components, position setting protrusions and position setting groove portions, or position indication portions may be added on the outer diameter portion 436 having the stepped portion 435 and the assembly hole 311 formed in the one side power transmission housing 310.

Referring to FIGS. 5 and 6, the present invention will be described.

The other side power transmission housing 320 is coupled to the other side of the one side power transmission housing 310.

The single drive axle brake for an electric forklift according to the present invention includes: the motor driving gear 120 directly connected to the shaft of the motor 100 inside the one side power transmission housing 310 and the other side power transmission housing 320; the reduction gear rotary shaft 210 disposed parallel with the rotary shaft 110 of the motor; a first reduction gear 220 of the reduction means 200 geared with the motor driving gear 120; and the differential gear unit 340 including the crown wheel 341 of the differential unit formed to be geared with the second reduction gear 230, the small differential gears 342 and 343 separating and transferring driving power of the crown wheel 341 to both sides, and one side and the other side large differential gears 344 and 345.

As described above, the differential unit disposed parallel with the shaft of the motor can transfer driving power of the motor to the right and left wheels, the reduction means arranged between the motor shaft and the differential unit which are arranged parallel to reduce the speed of the motor can easily adjust speed to reduce noise, and the drive axle which gets lower in the center of the drive axle can improve safety of the forklift.

Moreover, the brake unit 360 is coupled to the other side of the other side power transmission housing 320. The brake unit 360 has the main brake 380 for restricting the differential gear case 347 coupled to the other side large differential gear 345 and the subsidiary brake 390 for restricting the power shaft 349, and an outer case 361 of the brake unit is disposed to protect the brake unit from an external risk.

The shape of the outer case 361 will be described.

The inside of the outer case 361 is machined into a multi-stage cylinder. A piston mounting portion 371 on which a piston of the hydraulic cylinder 370 is mounted to move, a plate mounting portion 368 on which the plates, the main discs 382 and the subsidiary disc 392 are mounted, and a plate support mounting portion 369 to which a plate supporter 386 is coupled and fixed are formed on the outer case 361 in consecutive order.

The piston 373 is mounted on the piston mounting portion 371. The piston 373 advances toward the plate mounting portion 368 by a fluid supplied from the outside, and a piston return unit 376 for moving the advanced piston 373 to an initial position is provided.

The subsidiary disc 392 and the main disc 382 are sequentially arranged on the plate mounting portion 368, and the plate 397 is arranged between the subsidiary disc 392 and the main disc 382.

The plate supporter 386 is mounted on the plate support mounting portion 369.

A rotary bearing for supporting the differential gear case 347 is provided on an inner diameter portion of one side surface of the plate supporter 386, and a support portion 387 for supporting the plate supporter 386 is provided on the other side surface. A coupling hole 389 into which the support rod is inserted so as to fix the plate 397 to the outer case 361 is formed on a flange 388 formed toward the outer diameter at a predetermined distance from the other side.

In addition, the support rod having a spiral portion formed at an end portion thereof passes through the coupling hole 389 of the flange 388 and the assembly holes 398 formed in the plurality of plates and is coupled with the spiral portion of the outer case 361, so that the plurality of plates 397 are fixed to the outer case 361.

That is, when the fluid generated from the outside presses the plates 397 by the piston 373 of the hydraulic cylinder 370, the subsidiary disc 392 and the main discs 382 which are arranged sequentially compress and stop the plates 397 fixed to the outer case 361 by the support rod arranged between the subsidiary disc 392 and the main discs 382. When the main discs 382 and the subsidiary disc 392 are stopped, the main brake hub 381 and the subsidiary brake hub 391 are also stopped.

Furthermore, as the main brake hub 381 and the sub brake hub 391 are stopped, rotation of the differential gear case 347 and the power shaft 349 is stopped.

In addition, with reference to FIG. 3, the present invention will be described.

The other side of the housing 361 of the differential brake unit 360 is coupled to the other side wheel adapter module 500. The other side wheel adapter module 500 includes: the other side wheel adapter 520 where the wheel is mounted on the outside; the other side reduction unit 510 which decelerates the driving power transferred from the other side driving shaft 348 and transfers the decelerated power to the other side wheel adapter 520; and the other side wheel adapter connection bridge 530 which is formed to connect the other side reduction unit 510 and the differential unit brake unit 360.

In addition, a coupling portion 532 is formed near one side surface 531 of the other side wheel adapter connection bridge 530, and a coupling flange 533 protruding from the one side surface 531 toward the outer diameter at a predetermined interval is disposed on the coupling portion 532. The coupling flange 533 has a through-hole. An assembly hole 366 into which the coupling portion 532 is inserted is formed on the other side of the housing 361 of the differential brake unit 360, and a spiral hole 367 is formed at the other side near the assembly hole 366.

Moreover, a coupling portion 532 having a coupling flange 533 of the other side wheel adapter connection bridge 530 is forcedly fitted into the assembly hole 366. A coupling bolt is coupled to a spiral hole 367 formed in the other side near the assembly hole 366 of the other side power transmission housing 320 through a through-hole formed in the coupling flange 533.

As described above, the power transmission module provided in the power transmission housing having the motor is installed between the left and right wheel adapters to be biased toward any one wheel adapter, and so, the length of the other side driving shaft for transferring driving power to the right wheel adapter is longer than the one side driving shaft for transferring driving power to the left wheel adapter.

As described above, since the one side driving shaft and the other side driving shaft are different in length, there is a problem in that the both side driving shafts are individually manufactured and stored, and it is necessary to use them commonly.

In order to solve the above problem, a bearing insertion inner diameter portion 534 into which a bearing capable of connecting and supporting the power shaft 349 of the differential unit is disposed inside the coupling portion 532 formed on the one side surface 531 of the other side wheel adapter connection bridge 530. A spline collar 600 supported by the bearing is mounted in the bearing insertion inner diameter portion 534.

The spline collar supported by the bearing is mounted at a position corresponding to the different lengths of the both driving shafts. The other side driving shaft which is longer than the one side driving shaft is divided into the driving shaft 349 connected to the other side large differential gear and the other side driving shaft 348 connected to the other side wheel adapter module 500. The driving shaft 349 connected to the other side large differential gear is connected to one side of the spline collar, and the other side driving shaft 348 connected to the other side wheel adapter module 500 is connected to the other side of the spline collar, so that the one side driving shaft and the other side driving shaft can be formed in the same length and size.

The housing 361 of the differential brake unit 360 is adjusted in length so that the bearing insertion inner diameter portion 534 of the other side wheel adapter connection bridge 530 on which the spline collar 600 is mounted is located at a point where the other side driving shaft 348 and one side driving shaft 346 are equal in length.

Based on the power transmission housing, in which the differential gear unit 340 including: the motor driving gear 120 directly connected to the shaft of the motor 100 inside the one side power transmission housing 310 and the other side power transmission housing 320; the reduction gear rotary shaft 210 disposed parallel with the rotary shaft 110 of the motor; a first reduction gear 220 of the reduction means 200 geared with the motor driving gear 120; and the differential gear unit 340 including the crown wheel 341 of the differential unit formed to be geared with the second reduction gear 230, the small differential gears 342 and 343 separating and transferring driving power of the crown wheel 341 to both sides, and the one side and the other side large differential gears 344 and 345 is embedded, the one side wheel adapter module 400 is coupled to one side of the power transmission housing and the differential brake unit 360 and the other side wheel adapter module 500 are coupled to the other side of the power transmission housing in a blocked form. Therefore, compared with the conventional housing formed integrally, the housing is separable and is lightweight, and the housing or the internal components can be partially replaced at the time of maintenance.

Moreover, the one side wheel adapter module 400 and the other side wheel adapter module 500 can be divided into the one side and the other side wheel adapters 420 and 520 respectively having the wheels mounted outside and the one side and the other side reduction units 410 and 510, so the modules can be replaced or simply repaired during maintenance.

In addition, gear cutting is applied to the inner faces of the reduction unit housings of the both wheel adapters so that the reduction unit housings serve as the ring gear of the reduction unit. Moreover, the single drive axle brake according to the present invention can be easily assembled and disassembled and is convenient in maintenance due to the single modularization that the reduction unit housing and the ring gear are integrated.

While the present invention has been described with reference to the particular illustrative embodiments, it should be therefore understood that the embodiments of the present invention are just exemplary embodiments and the present invention is not to be restricted by the embodiments. It is to be appreciated that those skilled in the art can change or modify the embodiments without departing from the scope and spirit of the present invention.

It would be also appreciated that the present invention covers all such modifications and changes and the protective scope of the present invention will be clarified by the attached claims.

EXPLANATION OF REFERENCE NUMERALS

100: motor 110: rotary shaft of motor
120: motor driving gear 200: reduction means
210: reduction gear rotary shaft 220: first reduction gear
230: second reduction gear 300: differential unit
310: one side power transmission housing 311: assembly hole
312: mounting portion 320: the other side power transmission housing
321: coupling hole 330: power transmission housing
340: differential gear unit 341: crown wheel of differential unit
342: small differential gear 345: the other side large differential gear
347: differential gear case 349: power shaft
350: coupling ring 360: brake unit
370: hydraulic cylinder 371: piston mounting portion
373: piston 375: piston ring
376: piston return unit 380: main brake
381: main brake hub 382: main disc
390: subsidiary brake 391: subsidiary brake hub
392: subsidiary disc 397: fixed plate
400: one side wheel adapter module 410: one side reduction unit
420: one side wheel adapter 430: one side wheel adapter connection bridge
431: one side 432: first coupling portion
433: the other side 434: second coupling portion
450: bearing 500: the other side wheel adapter module
510: the other side reduction unit 520: the other side wheel adapter
530: the other side wheel adapter connection bridge 600: spline collar

The invention claimed is:

1. A single drive axle brake for an electric forklift to transfer driving power of a motor to wheels disposed on right and left sides of driving shafts, the single drive axle brake comprising:
   a differential unit (300) for separating and transferring the driving power received from the motor (100) to both sides;
   a differential gear unit (340) for distributing and transferring the driving power transferred from the motor to the wheels disposed on both sides; and
   a brake unit (360) for restricting the differential gear unit (340),
   wherein the differential gear unit (340) comprises:
      a crown wheel (341) receiving the driving power from the motor (100);
      a differential gear case (347) coupled with the crown wheel (341);
      a differential pinion gear mounted to be able to rotate and revolve with the differential gear case (347);
      differential side gears (344, 345) geared with the differential pinion gear inside the differential gear case (347) coupled with the crown wheel (341) of the differential gear unit (340); and
      a power shaft (349) for transferring the driving power provided from the differential gear unit (340) is connected to the differential side gears (344, 345) of the differential gear unit (340),
   wherein the brake unit (360) comprises:
      a main brake (380) for stopping a rotation of the differential gear case (347); and
      a subsidiary brake (390) for stopping a rotation of the power shaft (349),
      wherein the main brake (380) includes a main brake hub (381) and main discs (382) combined with the main brake hub (381),
      wherein a portion of an inner circumferential surface of the main brake hub (381) is joined to an outer circumferential surface (383) of the differential gear case (347), and the main discs (382) are combined on the outer circumferential surface (383) of the main brake hub (381) at regular intervals,
      wherein the subsidiary brake (390) comprises a subsidiary brake hub (391) and a subsidiary disc (392) coupled to the subsidiary brake hub (391),
      wherein an inner circumferential surface of the subsidiary brake hub (391) is coupled to an outer circumferential surface of the power shaft (349), and the subsidiary disc (392) is coupled to an outer circumferential surface (393) of the subsidiary brake hub (391) at regular intervals,
      wherein each of fixed plates (397) is inserted between each of the main discs (382) being joined at regular intervals and between each of the subsidiary discs (392) being joined at regular intervals,
      wherein the main disc (382) and the subsidiary disc (392) face each other and are arranged to be adjacent.

2. The single drive axle brake according to claim 1, wherein the main disc (382) and the subsidiary disc (392) have a doughnut shape of which the center is perforated, the inner diameter of the center of the main disc and the inner diameter of the center of the subsidiary disc are equal, and the outer diameter of the main disc and the outer diameter of the subsidiary disc are also equal.

3. The single drive axle brake according to claim 2, wherein since each plate (397) is disposed between the main disc (382) and the subsidiary disc (392), the discs and the plates are sequentially arranged, and the plates (397) are arranged at both ends, the plates, the main discs (382), and the subsidiary discs (392) are compressed and stopped by a hydraulic cylinder (370) which presses the plates (397), and the main brake hub (381) and the subsidiary brake hub (391) are stopped when the main disc (382) and the subsidiary disc (392) are stopped.

4. The single drive axle brake according to claim 3, wherein the hydraulic cylinder (370) is arranged on the opposite side of the differential unit to operate only one cylinder so that the main disc (382), the subsidiary disc (392) and the plate (397) are stopped simultaneously.

* * * * *